United States Patent [19]

Hoch

[11] 4,127,979
[45] Dec. 5, 1978

[54] HAY CONDITIONING ROLL

[75] Inventor: Manfried L. Hoch, Romeoville, Ill.

[73] Assignee: International Harvester Company, Chicago, Ill.

[21] Appl. No.: 761,577

[22] Filed: Jan. 24, 1977

[51] Int. Cl.² .......................................... A01D 49/00
[52] U.S. Cl. ...................................... 56/1; 56/DIG. 1
[58] Field of Search ................... 56/DIG. 1, 1, 110; 130/5 J, 5 R; 241/236

[56] References Cited

U.S. PATENT DOCUMENTS

| | | | |
|---|---|---|---|
| 1,219,927 | 3/1917 | Dibbets | 241/236 |
| 2,696,949 | 12/1954 | Grasse | 241/236 |
| 3,513,645 | 5/1970 | Garrett et al. | 56/DIG. 1 |
| 3,712,034 | 1/1973 | Praca | 56/DIG. 1 |
| 3,732,670 | 5/1973 | Milliken | 56/DIG. 1 |

Primary Examiner—Jay N. Eskovitz
Attorney, Agent, or Firm—Dennis K. Sullivan; Neal C. Johnson; F. David AuBuchon

[57] ABSTRACT

A hay conditioning roll is provided with a plurality of equally circumferentially spaced ribs extending across the axial length of the roll, the ribs having a slope relative to the axis of the roll reversing from positive to negative at least once. The configuration of the ribs such that the absolute value of the slope gradually decreases to zero, passes therethrough, and gradually increases upon approaching and passing the point of reversal, the rib configuration preferably being sinusoidal. A roll is adapted to run on a parallelly disposed roll of similar configuration reversed end for end, the ribs of one roll intermeshing with the grooves of the adjacent roll.

6 Claims, 3 Drawing Figures

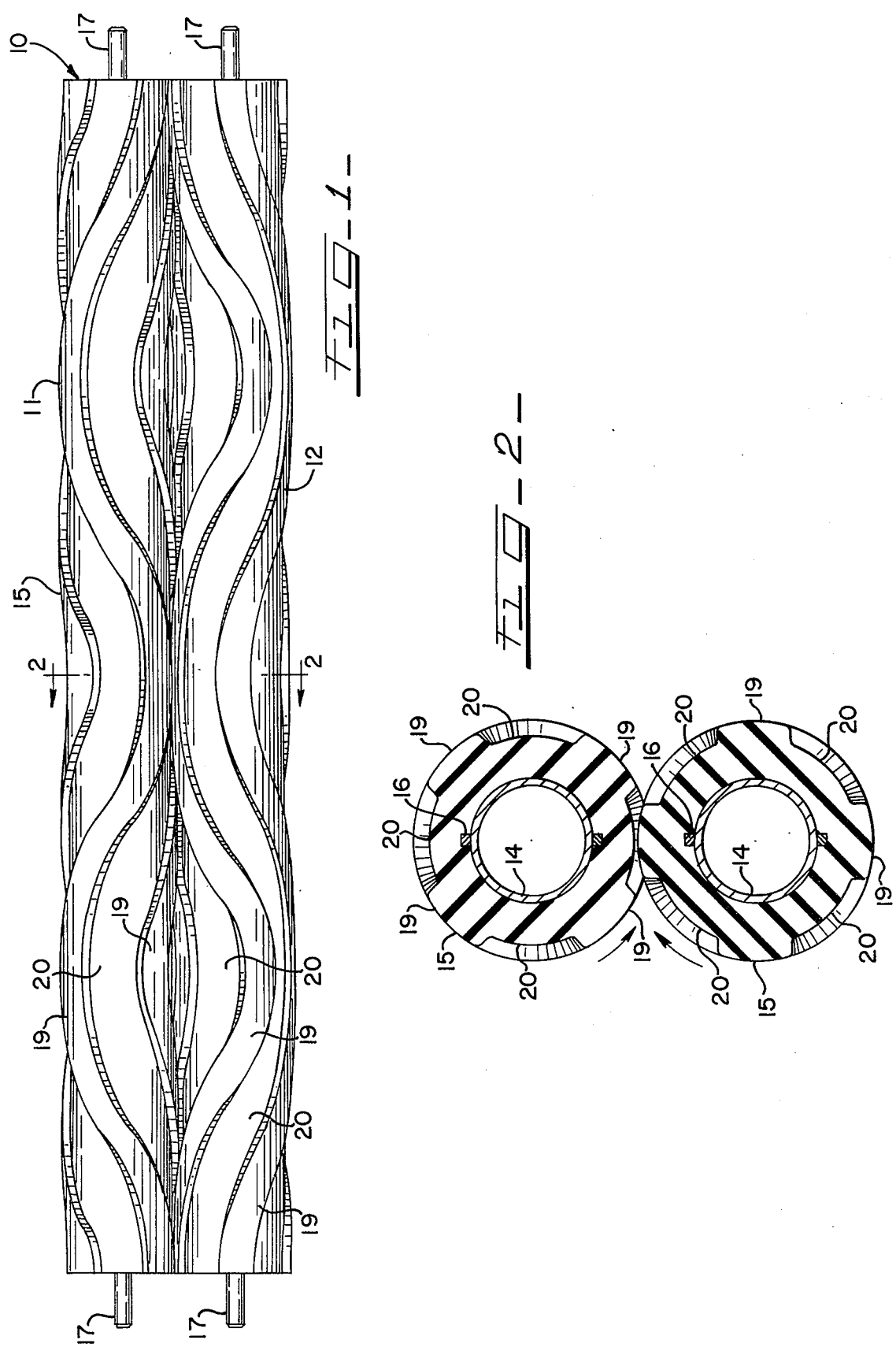

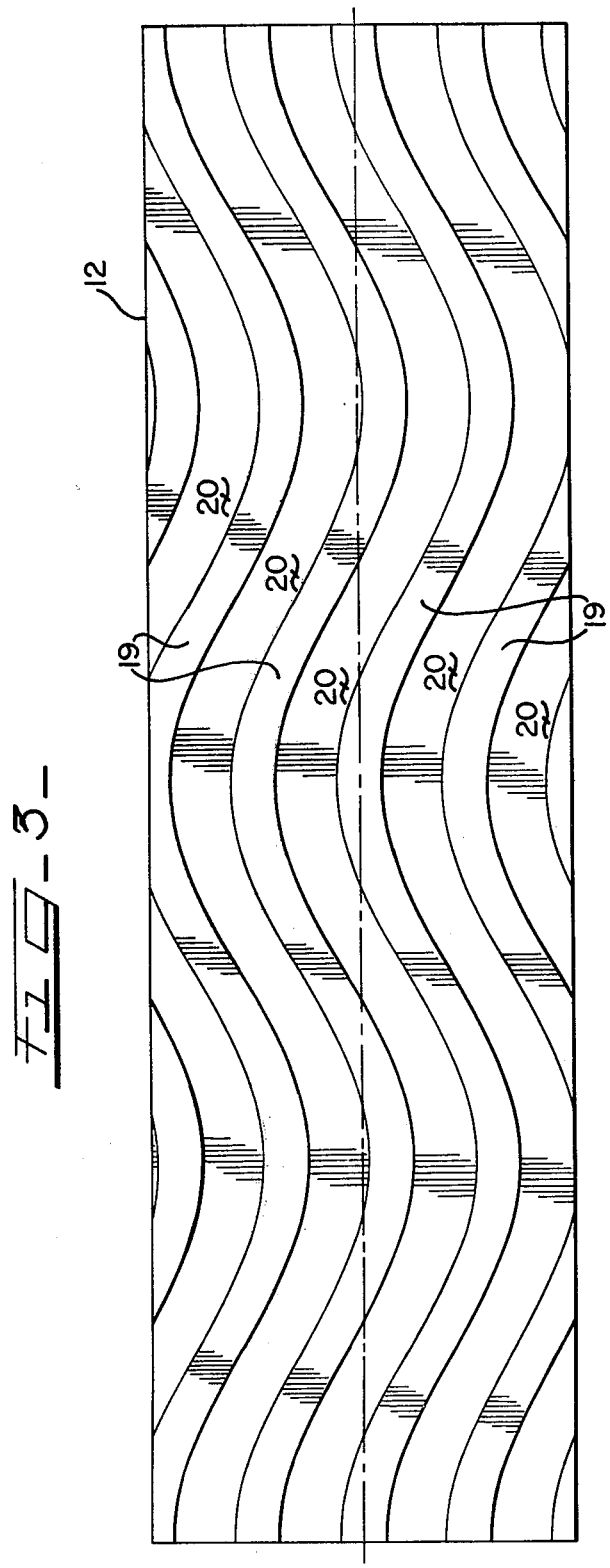

HAY CONDITIONING ROLL

BACKGROUND OF THE INVENTION AND THE PRIOR ART

This invention relates to hay conditioning rolls and, more particularly, to elastomeric intermeshing rolls having an improved surface configuration.

The general construction and operation of hay conditioning machines is well described in U.S. Pat. No. 2,811,819 and U.S. Pat. No. 2,921,426 both issued to S. C. Heth and U.S. Pat. No. 3,672,135 issued to Peacock et al., and will not be repeated herein since the invention claimed in the present application involves a roll the surface configuration for use in the machines of the general type described in these patents. Various types of rolls have been used on crop conditioning machines in the past. Originally, most rolls were metal until rubber rolls were developed. Rolls have been made with many types of surface configurations such as ribs, screws and other types of surface variations in an attempt to better perform the function of crimping and/or crushing hay or other similar crops passing between a pair of such rolls. Many of the prior rubber rib configurations did not provide the proper conditioning of both the hay stalks and leaves that is necessary for uniform drying of the hay. In an attempt to provide more uniform crushing and crimping actions, rolls were developed with intermeshing ribs or lugs. A typical example of such prior art rolls are illustrated in U.S. Pat. No. 3,732,670 to Milliken et al., U.S. Pat. No. 3,488,929 to Hale and U.S. Pat. No. 3,513,645 to Garrett et al. The latter patent illustrates interlocking rubber rolls having circumferentially spaced ribs, the ribs being arranged in a chevron pattern. This type of pattern, wherein the point of meshing varies as the roll rotates due to the helical configuration of the ribs, produces a smoother operation and tends to draw material away from both ends of the rolls towards the center thus eliminating bunching at the ends. However, with this type of roll, certain types of lighter material, such as alfalfa, tend to be carried toward the center of the roll and bunch up due to the chevron configuration. Eventually these materials pass through the rolls in a clump which prevents some of the material from being properly conditioned. Further, with the long helical shape, longer stalk materials can become oriented along the length of the groove and not be properly crimped.

Accordingly, it is an object of the invention described and claimed herein to provide a new and improved conditioner roll configuration wherein the slope of the ribs becomes parallel or nearly so to the axis of the roll when the slope of the ribs is reversing from positive to negative.

It is a further object of the invention to provide the surface configuration wherein the slope of the ribs relative to the axis of the roll is continuously variable.

These and other objects of the invention are specifically met in a hay conditioning roll having an elongated cylindrical elastomeric body having a plurality of equally circumferentially spaced ribs extending across the length of the body portion. The ribs and grooves are oriented in a reversing pattern, preferably sinusoidal, across the length of the rolls such that the absolute value of the slope of the ribs relative to the axis gradually decreases to zero, passes therethrough, and gradually increases upon approaching and passing a reversal of the rib pattern. The sinusoidal configuration further provides a continuously variable slope such that long crops cannot lie along the corner of a groove and pass through the rolls without being conditioned.

BRIEF DESCRIPTION OF THE DRAWINGS

Other objects and advantages of the invention will become more apparent upon reading the detailed description and upon reference to the drawings, in which:

FIG. 1 is a frontal view of a pair of conditioning rolls having a surface configuration in accordance with the invention herein;

FIG. 2 is a cross section of the conditioning rolls of FIG. 1 taken along the line 2—2 thereof; and, FIG. 3 is a development of the periphery of one of the rolls of FIG. 1.

DETAILED DESCRIPTION OF THE PREFERRED EMBODIMENT

Referring first to FIGS. 1 and 2, there is shown a hay conditioning roll set generally designated 10 including intermeshing rolls 11 and 12. A shaft or core 14 extends axially through the cylindrical body portion 15 of each of the rolls 11 and 12. The cylindrical body portion 15 of the roll is made of rubber or other elastomeric material and can be manufactured in a number of ways. In the least expensive method, a series of discs cut from tire carcasses or similar material are arranged axially on the shaft 14, keys 16 restraining rotational movement of the discs relative to the shaft. The discs are compressed axially on the shaft 14 under high pressure and locked by snap rings. The cylindrical body portion 15 could also be molded directly on the shaft 14 or molded separately with a longitudinal opening to receive the shaft, all of the above being well known to those of skill in the art. A coaxial shaft extension 17 protrudes from each end of the shafts 14 for journalling the rolls in adjacent parallel relationship in a hay conditioning machine (not shown).

Disposed in substantially equally circumferentially spaced relationship about the periphery of the elastomeric cylindrical body portion 15 are four ribs 19 integral therewith which define four grooves 20 therebetween. Grooves 20 are circumferentially wider than the ribs 19 so that when the rolls 11, 12 are disposed in closely spaced adjacent parallel relationship, as shown in FIG. 2, they will intermesh, but preferably not contact each other, when rotated toward each other in the direction indicated by the arrows in FIG. 2, the rolls 11, 12 being driven in timed relationship as is well known.

It will be seen that the rolls 11 and 12 have identical surface configurations except that the roll 12 has been reversed end for end relative to the roll 11 so that when they are rotated together the ribs 19 of the one roll will enter the grooves 20 of the other across the full width of the rolls.

The configuration of the ribs across the length of the roll broadly comprises a series of interconnected or alternately inverted arcuate shapes extending across the axial length of the rolls. With this configuration, it will be noted that the ribs 19 are generally at an angle with respect to the roll axis, the slope reversing periodically from positive to negative. The arcuate shapes provide a slope of the ribs that gradually approaches zero as the reversal point is approached, passes through zero, and gradually increases negatively. Thus, near the reversal point, lateral movement of crops passing through the rollers is avoided or minimized so that the bunching of light crops at the reversal is eliminated.

Viewing the surface configuration in greater detail and referring to FIG. 3, which is a development of the roll surface, it will be seen that the configuration of the ribs 19 and the grooves 20 is sinusoidal, comprising two cycles of a cosine curve generated by the equation $Y = a \cos(\omega x)$ where a is one half the desired circumferential peak to peak distance and $\omega = 2\pi/l$, l being the length of a cycle, in this case, half the roll length. It should be understood that although two full cycles have been used on the roll illustrated, the cycles could be cut off at the ends of the roll to produce an angular relationship at the ends of the rolls between the ribs 19 and the roll axis which would draw material inwardly from the roll ends to prevent crops from bunching thereat. The sinusoidal shape is considered preferable to an interconnected series of other arcuate shapes, which might be interconnected by straight lines, because in addition to producing the desired gradual decrease in the absolute value of the slope of the rib to zero as a reversal is passed, the sinusoidal shape also produces a continuously variable slope at all points. Since the ribs 19 are of lesser width than the grooves 20, it is possible for a stalk to lay lengthwise in the corner of a groove and pass through the rolls without being crimped or crushed. With a continuously variable slope, the ribs 19 are always curved and some portions of the stalks, which are generally straight, will extend sufficiently into the middle of the groove to be crushed by the rib of the other roll.

It is noted that in the manufacture of rolls having this configuration using tire carcass discs, wherein the grooves are cut in the roll after the discs are assembled, the width of the grooves perpendicular to the ribs 19 varies, the circumferential width staying the same at all points. Thus, more than one pass with a cutter of a width less than the minimum groove width is necessary. If the roll is molded, this presents no problem.

Various other changes can be made in the illustrative embodiments shown herein without departing from the scope of the invention. For example, although the ribs 19 are circumferentially equally spaced, the spacing of the ribs could be varied somewhat depending on the groove width provided that the ribs remain in intermeshed relationship with the grooves of the other roll. Also, one roll of this configuration could be used with a smooth roll as in conventional rubber-steel roll sets.

What is claimed is:

1. A hay conditioning roll comprising an elongated cylindrical elastomeric body having a plurality of substantially equally circumferentially spaced elastomeric ribs extending continuously across the axial length of the body, said ribs comprising an interconnected series of alternately inverted arcuate shapes having a slope relative to the axis of said roll reversing from positive to negative at least once across the axial length of said roll, the absolute value of said slope gradually decreasing to zero, passing therethrough, and gradually increasing upon approaching and passing the point of reversal such that lateral accumulation of crops at the points of reversal is avoided.

2. The invention in accordance with claim 1 and the slope of said ribs being continuously variable across the axial length of said roll.

3. The invention in accordance with claim 2 and said ribs having a sinusoidal configuration across the length of said roll.

4. The invention of claim 3 and said sinusoidal configuration extending for more than one cycle.

5. A hay conditioner roll assembly comprising a pair of intermeshing rolls disposed in adjacent parallel relationship, said rolls having a substantially identical surface configuration except one roll being reversed end for end relative to the other roll, each of said rolls comprising:
an elongated cylindrical elastomeric body having a plurality of substantially equally circumferentially spaced ribs of uniform circumferential width extending continuously across the axial length of said body and defining a plurality of grooves therebetween, the configuration of said ribs relative to the axis of said roll being a cosine wave of at least one period.

6. The invention in accordance with claim 5 and said grooves being circumferentially wider than said ribs.

* * * * *